(12) United States Patent
Sherlock et al.

(10) Patent No.: US 6,499,706 B1
(45) Date of Patent: Dec. 31, 2002

(54) EMPLACEMENT STAND

(75) Inventors: Mary H. Sherlock, Waldorf, MD (US); Jerome W. Gray, Indian Head, MD (US); Edward Hammett, Marbury, MD (US); Dale Gjerning, Pomfret, MD (US); David Gill, Mechanicsville, MD (US); Kenneth Poe, Welcome, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/822,307

(22) Filed: Mar. 29, 2001

(51) Int. Cl.⁷ .............................................. F16M 11/02
(52) U.S. Cl. .................... 248/177.1; 248/165; 248/415; 248/425
(58) Field of Search ............................... 248/177.1, 139, 248/156, 159, 165, 371, 413, 418, 425, 432, 415, 558

(56) References Cited

U.S. PATENT DOCUMENTS

| | | | | |
|---|---|---|---|---|
| 1,344,940 A | * | 6/1920 | Gavin | 108/8 |
| 2,194,800 A | * | 3/1940 | Ley | 24/278 |
| 2,704,235 A | * | 3/1955 | Bion | 108/148 |
| 2,759,528 A | * | 8/1956 | Rachman et al. | 108/5 |
| 3,970,274 A | * | 7/1976 | Resk | 248/185.1 |
| 4,225,105 A | * | 9/1980 | Nakamura | 248/184.1 |
| 4,497,077 A | * | 2/1985 | Provost | 248/156 |
| 4,770,382 A | * | 9/1988 | Lehti | 248/181.2 |
| 4,922,824 A | * | 5/1990 | Schubart | 102/387 |
| 5,163,648 A | * | 11/1992 | Schneider | 248/154 |
| 5,308,029 A | * | 5/1994 | Bingham | 248/159 |
| 5,435,509 A | * | 7/1995 | Bingham | 248/159 |
| 5,750,915 A | * | 5/1998 | Bedegrew et al. | 102/358 |
| 5,911,393 A | * | 6/1999 | Reuter | 248/181.1 |
| 2002/0056794 A1 | * | 5/2002 | Ibrahim | 248/177.1 |

* cited by examiner

*Primary Examiner*—Anita King
*Assistant Examiner*—Naschica S. Morrison
(74) *Attorney, Agent, or Firm*—Mark Homer

(57) ABSTRACT

The present invention is an emplacement stand for holding explosive ordnance disposal tools that comprises a support base having tapered pegs evenly spaced around the outside of the support base extending outward at a downward angle. Detachable legs may be attached to the tapered pegs or each other to increase the height of the support base. A pivot arm slides through a hollow bearing ring within the support base and a set screw connector locks the pivot arm into a specific desired position after moving the pivot arm up or down within the support base. A pivot base, having a tool cradle connected to a disc shaped surface attaches to a clevis slot within the pivot arm through a pin that allows the disc shaped surface to freely pivot about the pin within the slot. A second set screw connector locks the disc shaped surface into place within the clevis slot. An explosive ordnance disposal energetic tool, countermeasure or warhead system of various shapes and geometries may then be placed and clamped into the tool cradle.

16 Claims, 3 Drawing Sheets

EMPLACEMENT STAND

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to an inexpensive, disposable emplacement stand for orienting energetic tools, on a variety of surfaces and terrains, for precision targeting. More particularly, the present invention pertains to a device to: (a) orient a variety of energetic countermeasure tools for rendering safe or disrupting Unexploded Ordnance (UXO) and Improvised Explosive Devices (IEDs), and (b) orient offensive directed effects warhead/weapon systems.

2. Brief Description of the Prior Art

Disposing of unwanted UXO under military operational field conditions requires the ability to respond quickly and safely to threats under a myriad of different conditions. Numerous specialized countermeasure tools are used to neutralize the explosive main fill, to disrupt the firing train (i.e., disarm), or to detonate UXO and IEDs. The sizes and shapes of these countermeasure tools vary depending upon the mission, however, the emplacement of the tools is critical, particularly during a surgical render safe procedure used to disrupt the firing train of UXO and IEDs.

Currently explosive ordnance disposal (EOD) countermeasure tools are placed in their proper position by either developing tool-unique adapters to interface an EOD tool to a commercial stand items or by fashioning an emplacement device using a combination of materials available to EOD personnel. Placement stands for certain types of commercial items, such as camera tripods, have been tested or used for EOD tool placement with limited success. One popular design is a reasonably inexpensive, tripod with a ball and socket joint. This device has a thumbscrew that can be used to tighten the ball against the socket to avoid movement once positioned. However, this stand, like other commercial stands, has several limitations for use in emplacing EOD countermeasure tools. The ball and socket is set at a predetermined height limiting the range of direct targeting. Also, locking in on the precision targeting of an EOD tool using a freely rotating ball joint is cumbersome and time consuming.

Generally, commercial stands are rather bulky and heavy, are not designed to hold the diverse range of available EOD tools without significant modification, pose undo safety risks to the EOD operator due to poor balance of the tool on the stand, have a limited range of motion and adjustment capability to accommodate undulating terrain, are not designed to provide ready access to some potential threat targets, and require adapters to interface EOD tools with the commercial stand. The majority of the commercial stands also are comprised of metal components, which could result in potentially dangerous fragments upon initiation of the EOD energetic tools. While certain commercial stands have been designed to provide relief from some of the shortcomings listed above, they are generally too heavy and expensive, having not been designed to be consumable, and, therefore, are not practical alternatives for placement of EOD countermeasure tools.

Field fashioned stands may pose an undo safety risk to the EOD operator by exposing the EOD technician to an explosive event if the field fabricated stand tips over or structurally collapses due to a poor design, high winds, and deterioration of the fastening systems (for example, duct tape) under harsh environments, such as precipitation, extreme temperature, and salt fog.

Due to the above limitations with commercially available stands and field fashioned stands, EOD personnel often rely upon placement EOD tools using sandbags. Sandbags are fabricated on-site and stacked up to the proper height. However, application of this technique poses a potential for non-symmetrical tamping of explosive EOD tools, and thus potentially affects the tools' ability to disrupt a threat target. Also, most EOD procedures require precision placement of a tool and accomplishing this with sandbags is extremely time consuming and hazardous. Any procedure which requires EOD personnel to be exposed to UXO or IEDs for long periods of time unnecessarily exposes the personnel to the risk of these threats functioning (detonating) as designed. Employing EOD tools using sandbags has the same limitations as field fashion stands. Sandbags take time to fabricate and they limit the range of motion and adjustment capability available to the EOD operator.

SUMMARY OF THE INVENTION

Due to the limitations of the current technology described above, a device is required by the military to support and precisely position EOD tools in order to neutralize, disrupt or render safe unexploded ordnance (UXO) and Improvised Explosive Devices (IEDs). To accomplish this mission, the present invention was developed. In general, the device comprises an emplacement stand to clamp explosive or propulsive energetic EOD tools, countermeasures or warhead systems of various shapes in a cradle, whereby the cradle may be adjusted vertically, horizontally, and angularly (in three dimensions) in order to carry out multiple mission requirements.

Preferred embodiments of the device should also be easily transportable in a collapsed condition for compact storage so that EOD personnel may easily use the device in numerous locations. The preferred embodiments of the device readily accommodate the emplacement of said device on undulating terrains and requires little time to assemble, setup, and deploy. The preferred embodiments are manufactured using plastic injection molded techniques which provides an inexpensive device if procured in large quantities.

Accordingly, it is an object of this invention to support and position EOD tools for use to disrupt or render safe unexploded ordnance (UXO) and Improvised Explosive Devices (IEDs).

It is a further object of this invention to be transportable in a collapsed condition for compact storage.

It is further the object of this invention to accommodate the emplacement of said device on undulating surfaces and terrains.

It is further the object of this invention to be of such a design as to accommodate plastic injection molded manufacturing techniques to provide an inexpensive device if procured in large quantities.

This invention accomplishes these objectives and other needs related to the support and positioning of EOD tools.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The present invention is an emplacement stand for holding explosive ordnance disposal tools that comprises a support base having pegs evenly spaced around the outside of the support base extending outward at a downward angle. Detachable legs may be attached to the pegs, providing an interference fit of the mating parts. A pivot arm slides within a bearing hole in the support base and is locked in place via a set screw so that the pivot arm may be locked into a specific desired position after moving the pivot arm up or down, or rotating the pivot arm within the support base. A pivot base, having a tool cradle connected to a disc shaped surface, connects to a pivot arm via a u-shaped clevis and pin through which the pin allows the disc shaped surface to freely pivot about the pin within the clevis slot. A second screw connector locks the disc shaped surface into place relative to the pivot arm. An EOD tool, countermeasure tool, or other warhead or gun system may then be placed into the tool cradle and clamped or secured in place using nylon straps or tape.

Figure 1:
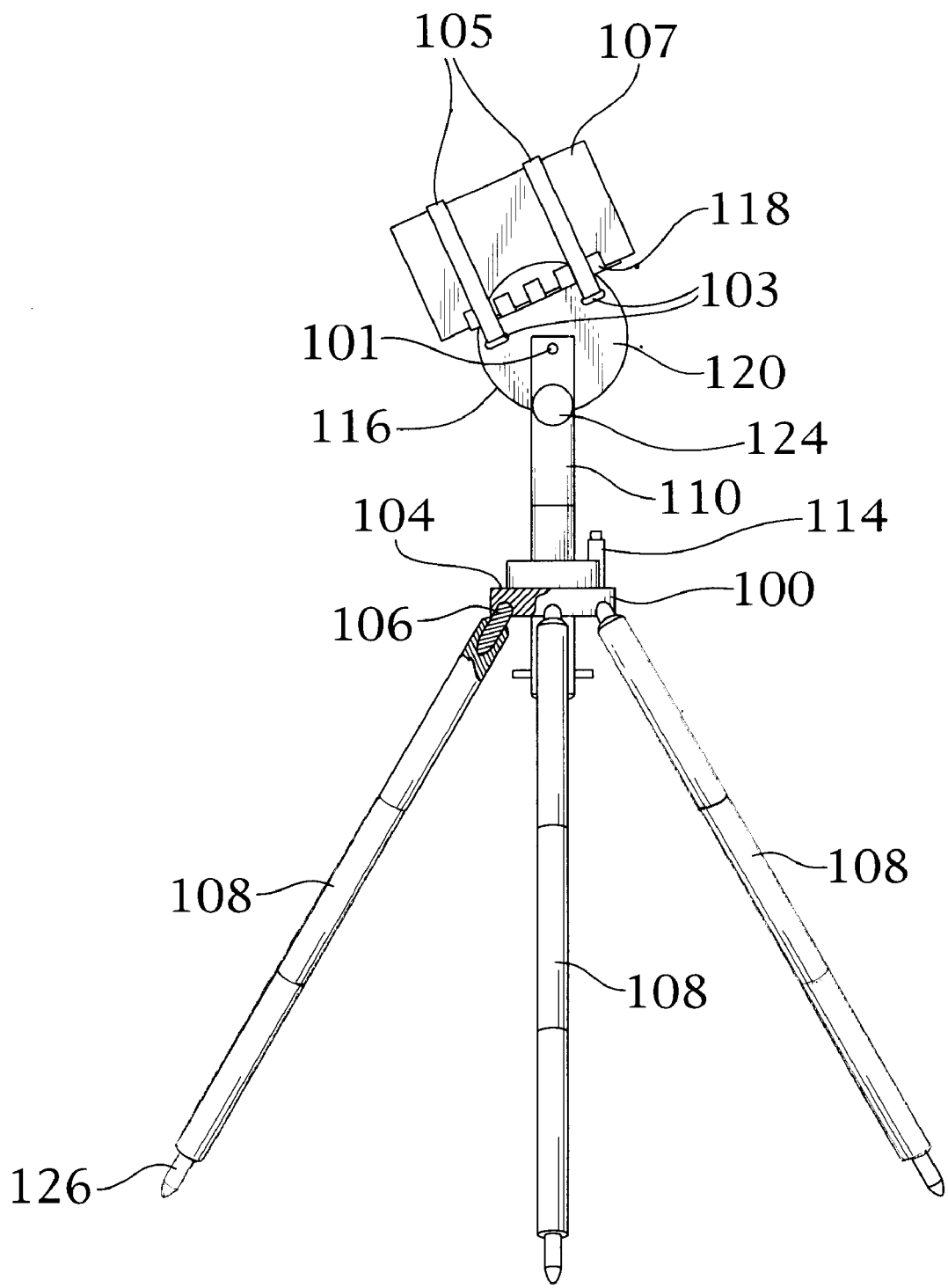
FIG. 1 is a side view of one embodiment of the invention.
Figure 2:
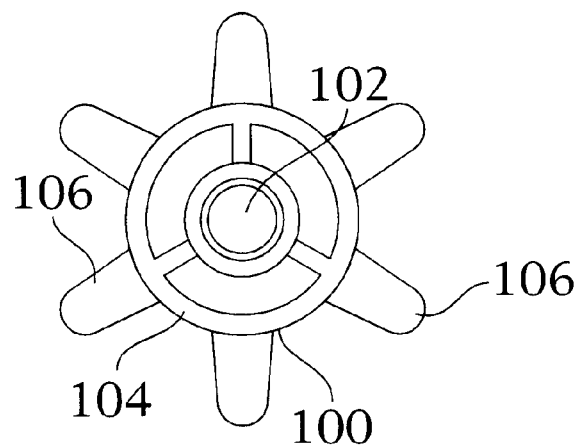
FIG. 2 is a top view of the support base of the embodiment of the invention shown in FIG. 1.
Figure 3:
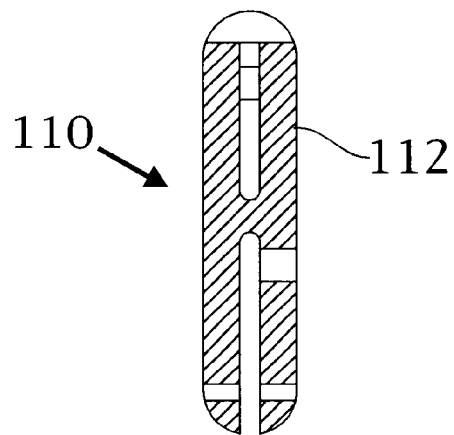
FIG. 3 is a cross sectional view of the pivot arm of the embodiment of the invention shown in FIG. 1.
Figure 4:
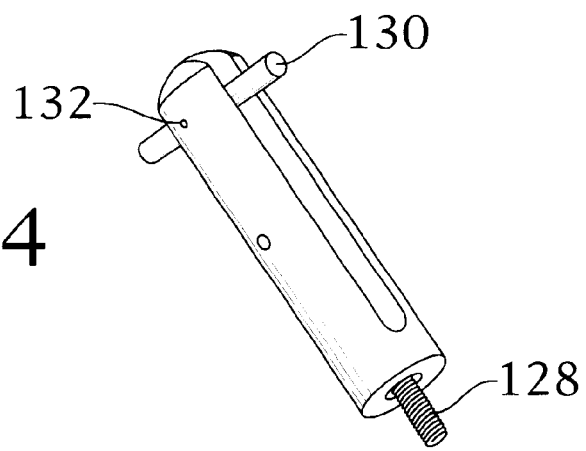
FIG. 4 is an angled view of an embodiment of the pivot arm including a threaded insert rod.
Figure 5:
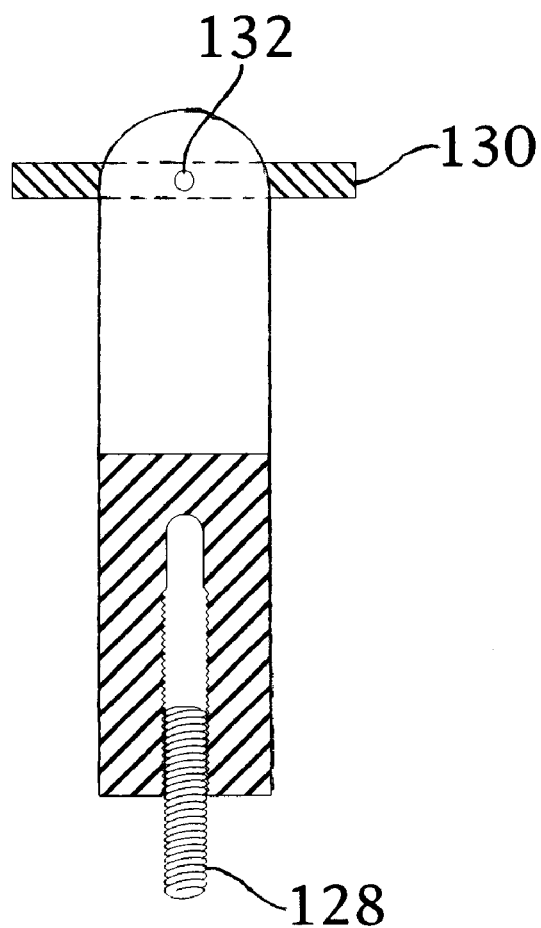
FIG. 5 is a cross sectional view of the pivot arm shown in FIG. 4.

Referring to FIGS. 1–3, the invention is an emplacement stand for holding explosive ordnance disposal tools comprising a support base 100 having a hollow bearing center ring 102 and an outer ring 104. At least three pegs 106 are attached to the outer circumference or perimeter of the support base 100, extending outward at a downward angle. At least three detachable legs 108 are attached to the pegs 106 until engagement causes in interference fit to lock the legs 108 securely onto the pegs 106. A pivot arm 110, having a clevis slot 112, attaches to the support base center bearing ring 102 through a first set screw connector 114 by sliding the pivot arm 110 into the center bearing ring 102 and locking the pivot arm 110 into place through tightening the set screw connector 114. The pivot arm 110 can be placed in any vertical position in this manner or can be rotated into any position. A pivot base 116, having a tool cradle 118 attached to a disc shaped surface 120, is attached within the clevis slot 112 by a pin 101 allowing the pivot base 116 to pivot and rotate freely around the pin 101. A depiction of an explosive ordnance disposal tool 107 is placed upon the tool cradle 118. A second set screw connector 124 is then used to lock the pivot base 116 into place, allowing the ordnance disposal tool to be placed on the cradle and receive sufficient support to aim and initiate the tool for its mission.

The support base 100 has a hollow center ring 102 that should be sized so that the pivot arm 110 may freely move vertically or rotatably through the hollow center bearing ring 102. However the difference between the diameter of the hollow center bearing ring 102 and the diameter of the pivot arm 110 should be such that the set screw connector 114 may lock the pivot arm 110 into place. The size of the diameter of the support base 100 should provide sufficient support for the device and may be selected by one skilled in the art. One preferred diameter for the support 100 base comprises approximately 2.5 inches. The material of which the support base is made is dependent upon the make up of the remainder of the device and the particular uses for the device, and, therefore, may be selected by one skilled in the art. One preferred material is plastic, due to its strength, cost and light weight. A more preferred material is ABS plastic.

At least three pegs 106 are attached to the outer ring 104 of the support base 100 at a downward angle. Preferably, these pegs 106 are tapered in shape so the detachable legs 108 may be attached to the support base 100 by snugly fitting over the pegs 106. Dependent upon stability required for particular missions of the device, any number of pegs 106 may be placed upon the outer ring 104 in order to attach more detachable legs 108 for stability. This number may be selected by one skilled in the art. One preferred number of pegs 106 is six. This allows up to six detachable legs 108 to be attached to the support base 100 for stability of the device. The downward angle of the pegs 106 may be selected by one skilled in the art depending upon the size of the components chosen to construct the device and the stability required for the mission. One preferred downward angle comprises approximately 30 degrees from vertical.

The number of detachable legs 108 chosen, may be selected by one skilled in the art, but at least three detachable legs are needed to provide support to the device. In a preferred embodiment, the detachable legs 108 are constructed to provide a recess at an end of the detachable legs 108 wherein the recess fits snugly over the tapered pegs 106 and a tapered peg 126 at the other end that comprises a size similar to the tapered pegs 106 so that the recess also snugly fits over the tapered peg 126. This allows the length of the detachable legs 108 to be extended by attaching multiple detachable legs 108 to each other as well as the tapered pegs 106. In one embodiment, three detachable legs 108 are attached to each other and to the tapered pegs 106 and three more detachable legs 108 are attached to the bottom of the first set of detachable legs 108. In another embodiment, three more detachable legs 108 are attached to the bottom of the second set of detachable legs 108, thereby, tripling the length of each leg 108 attached to the support base 100. Dependent upon how even the deployment surface is for the device, other embodiments of the invention may include an uneven number of detachable legs 108 attached to each other for stability. In a preferred embodiment, the detachable legs 108 comprise a length of approximately 4 inches. The preferred material of the detachable legs comprises an ABS plastic.

The pivot arm 110 is attached to the support base 100 through the hollow bearing ring 102. After the horizontal placement of the pivot arm is selected by EOD personnel, the pivot arm 108 is locked in place through a set screw connector 114. In one embodiment, the set screw connector 114 comprises a nylon thumbscrew with a cap screw and wing head knob screw to tighten the screw connector 114. The set screw connector 114 is placed through the support base 100 and abuts the pivot arm 108 in order to lock the pivot arm 110 into place.

Referring to FIGS. 1 and 3–5, the pivot arm 110 comprises a clevis slot 112 wherein the disc shaped surface 120 (not shown) may be placed. In one embodiment, the pivot arm 110 may be comprised of two separate cylindrical portions. The portion set forth in FIGS. 4–5, comprises a threaded insert rod 128 embedded into one end of the portion. The second portion (not separately depicted) comprises the clevis slot 112 and is connected to the first portion by screwing the threaded insert rod 128 into the second portion at the end of the second portion not containing the slot 112. The main reason for breaking the pivot arm 110 into two cylindiracl portions is to make the device easy to assemble and disassemble for transport. In one embodiment of the invention, the pivot arm may also comprise a rotatable rod 130 at the end of the pivot arm 110 opposite the tool cradle 118, that comprises a length greater than that of the diameter of the bearing ring 102 (not shown) and is attached to the pivot arm 108 through a pin 132 that allows the rotatable rod 130 to freely rotate about the pin 132. This rotatable rod 130 would allow the pivot arm 110 to be placed through the hollow bearing ring 102 in a position where the pivot base 116 is under the support base 100. This is accomplished by rotating the rotatable rod 130 to a position substantially parallel to the pivot arm 110, placing the pivot arm 110 through the support base 100, and rotating the rotatable rod 130 to a position substantially perpendicular to the pivot arm 110 so that the rotatable rod 130 blocks the pivot arm 110 from continuing through the support base 100. In such a configuration, for many requirements, the screw connector 114 would not provide sufficient pressure to the pivot arm 110 to lock the pivot arm 110 into place. One preferred material for the pivot arm 110 comprises ABS plastic.

Figure 6:
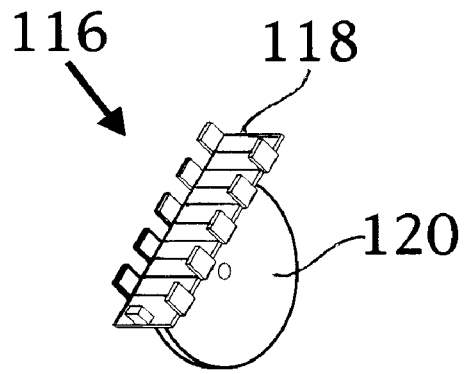
FIG. 6 is an angled view of the pivot base of the embodiment of the invention shown in FIG. 1.

Referring to FIGS. 3 and 6, the pivot base 116 comprises a disc shaped surface 120 attached to a tool cradle 118. The disc shaped surface 120 connects to the pivot arm 110 by placing the pivot base within the clevis slot 112 within the pivot arm 110 and using a pin 101 to connect the pivot base 116 to the pivot arm 110. The pivot base 116 may rotate freely within the slot 112 around the pin 101. The disc shaped surface 120 is locked into place through a second set screw connector 124. In a preferred embodiment, the second set screw connector 124 is identical to the screw connector 114 (not shown). The tool cradle 118 may be designed to hold numerous tools and may be chosen by one skilled in the art. In the embodiment of the invention shown in FIG. 6, the tool cradle 118 comprises a plurality of tabs attached to the tool cradle in order to hold different EOD tools in a more stable manner. In another embodiment of the invention, a strap 105 or numerous straps 105 may be attached to the pivot base 116 and clamped around the EOD tool on the tool cradle 118 for more stability. One preferred embodiment comprises two nylon straps 105 that go through holes as attachment points 103 in the disc shaped surface 120. A preferred material for the pivot base is ABS plastic.

The present invention also comprises a method for emplacing an explosive ordnance disposal tool using the device described above, placing the EOD tool on the tool cradle 118, and strapping the EOD tool to the tool cradle 118. In a preferred embodiment of this method, the device may be assembled and disassembled so the device may be easily transported. In one embodiment, the device is manufactured so that the following are separate parts and can easily be stored and transported: the support base 100, the detachable legs 108, the pivot arm 110 wherein the pivot arm is broken into two portions as described above and the pivot base 116 is manufactured so it is pre-attached to pivot arm 110 portion containing the slot 112.

What is described are specific examples of many possible variations on the same invention and are not intended in a limiting sense. The claimed invention can be practiced using other variations not specifically described above.

What is claimed is:

1. An emplacement stand for holding explosive ordnance disposal tools, comprising:
    a support base having a hollow center bearing ring and an outer ring;
    at least three pegs attached to the outer ring, extending outward at a downward angle;
    at least three detachable legs attachable to the three pegs;
    a pivot arm, having a clevis slot, attached to the support base hollow center bearing ring through a first set screw connector wherein the pivot arm can move to be adjusted vertically, rotatably, or both within the center bearing ring and locked in place by the first set screw connector;
    a pivot base, having a tool cradle attached to a disc shaped surface, wherein the disc shaped surface connects to the pivot arm within the clevis slot through a pin, making the disc shaped surface rotatable about the pin within the clevis slot;
    a second set screw connector that locks the disc shaped surface in place within the clevis slot; and
    a rotatable rod, having a length greater than a diameter of the hollow ring, connected to an end of the pivot arm opposite the slot, through a second pin wherein the rotatable rod may rotate freely around the second pin so that the rotatable rod may rotate to block the pivot arm from passing through the hollow ring.

2. The emplacement stand of claim 1, further comprising two attachment points on the pivot base and two nylon straps to clamp the explosive ordnance disposal tools on the tool cradle.

3. The emplacement stand of claim 2, wherein the attachment points comprise holes through the disc shaped surface.

4. The emplacement stand of claim 1, further comprising six evenly spaced pegs attached to the outer ring of the support base.

5. The emplacement stand of claim 4, wherein the detachable legs further comprise:
    a recess at an end of the detachable legs wherein the recess fits over the pegs; and,
    a tapered peg at an end wherein the recess fits over the tapered peg.

6. The emplacement stand of claim 5, wherein the pegs and the recess comprise a tapered shape.

7. The emplacement stand of claim 6, wherein the downward angle comprises approximately 30 degrees to increase the stability of the emplacement stand.

8. The emplacement stand of claim 7, further comprising 6 detachable legs.

9. The emplacement stand of claim 8, comprising 9 detachable legs.

10. The emplacement stand of claim 8, wherein the detachable legs comprise a length of approximately 4 inches.

11. The emplacement stand of claim 10, wherein the stand comprises a plastic material.

12. The emplacement stand of claim 11, wherein the stand comprises an ABS plastic material.

13. The emplacement stand of claim 12, wherein the first set screw connector and the second set screw connector comprise nylon thumbscrews.

14. The emplacement stand of claim 13, further comprising:
    a center of gravity;
    an explosive ordnance disposal tool placed on the tool cradle and having a second center of gravity wherein the second center of gravity acts through the center of gravity to increase stability of the emplacement stand.

15. The emplacement stand of claim 13, wherein the tool cradle may interface with explosive ordnance disposal tools of varying weights, sizes, and shapes.

16. The emplacement stand of claim 1, wherein the pivot arm comprises:
  a first section that attaches to the support base having a threaded insert rod attached thereto; and
  a second section attachable to the first section by screwing the second section onto the threaded insert rod.

* * * * *